United States Patent
Song (10) Patent No.: US 10,922,376 B2
(45) Date of Patent: Feb. 16, 2021

(54) PERFUME PACKAGE ACCESSORY DESIGN SYSTEM AND METHOD OF OPERATING PERFUME PACKAGE ACCESSORY DESIGN SYSTEM

(71) Applicant: Nag Mun Song, Icheon-si (KR)

(72) Inventor: Nag Mun Song, Icheon-si (KR)

(*) Notice: Subject to any disclaimer, the term of this patent is extended or adjusted under 35 U.S.C. 154(b) by 0 days.

(21) Appl. No.: 16/704,027

(22) Filed: Dec. 5, 2019

(65) Prior Publication Data

US 2020/0167397 A1 May 28, 2020

Related U.S. Application Data (63) Continuation of application No. PCT/KR2018/015282, filed on Dec. 4, 2018.

(30) Foreign Application Priority Data

Nov. 26, 2018 (KR) .................. 10-2018-0147782

(51) Int. Cl.
 *G06F 16/00* (2019.01)
 *G06F 16/958* (2019.01)
 (Continued)

(52) U.S. Cl.
 CPC .......... *G06F 16/958* (2019.01); *A45D 34/02* (2013.01); *A45D 2034/002* (2013.01)

(58) Field of Classification Search
 None
 See application file for complete search history.

(56) References Cited

U.S. PATENT DOCUMENTS 9,336,508 B2 * 5/2016 Soon-Shiong ......... G06Q 30/06
9,524,482 B2 * 12/2016 Yopp .................... G06Q 10/067
(Continued)

FOREIGN PATENT DOCUMENTS

KR  10-2002-0004542 A  1/2002
KR  10-2002-0086325 A  11/2002
(Continued)

OTHER PUBLICATIONS

Korean Office Action (KR 10-2018-0147782), KIPO, dated May 8, 2020.

*Primary Examiner* — Martin Mushambo
(74) *Attorney, Agent, or Firm* — Park & Associates IP Law, P.C.

(57) ABSTRACT

A method of operating a perfume package accessory design system includes a step of log-in, a step of remodeling a perfume package accessory, a step of applying a producer's appearance and the perfume package accessory to augmented reality, a step of returning data determining whether modeling of the perfume package accessory is suitable to the design server, a step of feeding back to the remodeling step when the modeling is determined not to be suitable, a step of feeding back to the remodeling step in case of infringement of copyright when the modeling is suitable, a step of assigning a production number to the perfume package accessory modeling data where there is no infringement of copyright, a step of registering the perfume package accessory modeling data on a public registration window, a step of allowing a purchaser to view the public registration window, and a step of allowing the purchaser to download the perfume package accessory modeling data.

7 Claims, 3 Drawing Sheets

(51) Int. Cl.
*A45D 34/02* (2006.01)
*A45D 34/00* (2006.01)

(56) References Cited

U.S. PATENT DOCUMENTS

| | | | | |
|---|---|---|---|---|
| 10,532,278 | B2* | 1/2020 | Nishimaki | G06F 3/013 |
| 2008/0043013 | A1* | 2/2008 | Gruttadauria | G06Q 30/02 |
| | | | | 345/419 |
| 2008/0162262 | A1* | 7/2008 | Perkins | G06Q 30/02 |
| | | | | 715/757 |
| 2015/0241708 | A1* | 8/2015 | Watanabe | G11B 27/11 |
| | | | | 386/230 |
| 2018/0154034 | A1* | 6/2018 | Jin | A61L 9/042 |
| 2018/0285923 | A1* | 10/2018 | Fateh | A61L 9/12 |
| 2019/0244436 | A1* | 8/2019 | Stansell | G06Q 30/0643 |

FOREIGN PATENT DOCUMENTS

| | | |
|---|---|---|
| KR | 20-0294266 Y1 | 11/2002 |
| KR | 10-2011-0037174 A | 4/2011 |
| KR | 10-1621250 B1 | 5/2016 |
| KR | 10-1840418 B1 | 3/2018 |
| KR | 10-1892062 B1 | 8/2018 |
| KR | 10-2064887 B1 | 1/2020 |

* cited by examiner

PERFUME PACKAGE ACCESSORY DESIGN SYSTEM AND METHOD OF OPERATING PERFUME PACKAGE ACCESSORY DESIGN SYSTEM

REFERENCE TO RELATED APPLICATIONS

This is a continuation of International Patent Application PCT/KR2018/015282 filed on Dec. 4, 2018, which designates the United States and claims priority of Korean Patent Application No. 10-2018-0147782 filed on Nov. 26, 2018, the entire contents of which are incorporated herein by reference.

FIELD OF THE INVENTION

The present invention relates to a perfume package accessory design system, a perfume package accessory design system application, and a storage medium for storing the same. More particularly, the present invention relates to an Internet commerce and Internet production support system and a method of operating the same, in which a producer terminal, a design server, and a purchaser terminal are connected to each other over the Internet.

BACKGROUND OF THE INVENTION

A perfume package accessory is an accessory having a perfume emanation function built therein, and Korea Patent No. 10-1840418 titled "Perfume Package for Earrings" discloses such a perfume package accessory.

The Korea Patent No. 10-1840418 has been limited to earrings, but the same idea can be implemented in the entire accessory fields.

For this purpose, the applicant is inventing Korea Patent Application No. 10-2017-0131258 titled "Perfume Package".

The production of such a perfume package accessory in the related art is performed so that a producer performs an operation with PC-based CAD, and transforms the same into a 3D printer production file for producing 3D printing, which was proposed as the most advanced method.

However, in this case it is difficult to derive the creative ideas of unknown producers distributed on the Internet cloud, whereby there is a problem that it is impossible to pioneer a new market.

Meanwhile, in the Internet environment, there is disclosed an application related to membership accessories ordering and selling service method and system based on Internet, in Korea Patent Application No. 10-2002-0047020, titled "Ordering membership accessories over the Internet". The present application provides a web page capable of inputting accessory selection information for selecting an accessory to be applied as a membership accessory and membership information for expressing membership for a meeting in which the user participates.

In addition, in Korea Patent Application No. 1020000038549 titled "Method of providing fashion coordination information over the Internet", consumers can easily access a coordination proposal made by a professional coordinator, and fashion companies introduce their products to numerous customers in the fastest way.

Efforts are being made to improve accessory designs by introducing the Internet environment into the accessory design field as described above. However, there is a problem in that a system for drawing creative ideas of unknown producers widely distributed in the Internet cloud environment and thus pioneering a new purchasing market is not provided.

SUMMARY OF THE INVENTION

The present invention has been made keeping in mind the above problems occurring in the related art, and an objective of the present invention is to provide a perfume package accessory design system and a method of operating a perfume package accessory design system that derive the creative ideas of unknown producers widely distributed in the Internet cloud environment to pioneer a new market, in an effort to improve accessory designs by introducing the Internet experience into accessory design field.

In order to achieve the above objectives, the present invention relates to a server accessing a PC or smartphone over an Internet, and provides a perfume package accessory design system including: a model design storage module forming and storing model designs of a perfume package accessory having a function of storing perfume; an image storage module uploading and saving an image photograph by a logged-in producer; a remodeling module remodeling the perfume package accessory by allowing a producer to select one of the model designs, load an image stored in the image storage module, and apply the image to the model design; an augmented reality module applying the perfume package accessory to augmented reality to output a wearing state when the producer inputs his/her video to a smartphone camera; a fixed design storage module storing perfume package accessory modeling information and output image data of the augmented reality module when the wearing state of the perfume package accessory is suitable; a copyright search module determining whether or not infringe a copyright of the fixed perfume package accessory; a production numbering module assigning a production number including a production control command of a 3D printer to the perfume package accessory of which copyright is determined not to be infringed; and an exhibition sales module registering an image of the perfume package accessory to which the production number is assigned to a public display so that a logged-in purchaser views the image and having a menu for the purchaser to make a purchase or set a license.

Herein, the model design storage module may include an algorithm that enables conversion of 2D images to 3D images and, when the producer uploads a sketched drawing, converts the same into the 3D model design to be stored.

In addition, the augmented reality module may be configured to include a camera active module for activating a camera of the PC or smartphone so that the perfume package accessory may be applied to a camera image in real time of the producer in an augmented reality manner.

In addition, the remodeling module may be configured to include a model design modification module for modifying a size and shape of the model design; and an image correction module for performing 2D or 3D conversion in such a manner as to conform to image correction of the photograph and the shape of the model design.

In addition, the remodeling module may be configured to include an option addition module for changing a function, a material, and information in the perfume package accessory of the model design, so that a design, a function, a material, and information of the perfume package accessory may be selectively added.

In addition, the exhibition sales module may be configured to include a dedicated exhibition module in which each producer simultaneously outputs a video, a photograph, an advertisement, and a promotional material for each perfume package accessory completed by the producer, to cause a logged-in purchaser to make a purchase and to make a license.

In addition, the perfume package accessory design system may include: a purchaser wearing augmented reality module applying the perfume package accessory displayed in the exhibition sales module to virtual reality to confirm a wearing state and store an augmented reality wearing video when a logged-in purchaser uploads his/her photograph; and an image making module uploading the augmented reality wearing video and filling-in a story for the augmented reality wearing video by the purchaser, thereby allowing a third party to confirm the video and the story included in the image making module.

In addition, a method of operating a perfume package accessory design system according to the present invention includes: a first step of logging-in to a design server through an application installed on a producer's portable terminal; a second step of providing a 3D model design and an image photograph of a perfume package accessory having a function of storing perfume in a database of the design server, to remodel the perfume package accessory with the image in the model design; a third step of allowing a producer to download the remodeled perfume package accessory modeling data and apply his/her appearance and the perfume package accessory to augmented reality with a camera of the portable terminal; a fourth step of returning augmented reality video data and data determining whether modeling of the perfume package accessory is suitable to the design server; a fifth step of feeding back to the second step when the modeling of the perfume package accessory is determined not to be suitable; a sixth step of determining whether or not to infringe a copyright when the modeling of the perfume package accessory is determined to be suitable and feeding back to the second step when the copyright is determined to be infringed; a seventh step of assigning a production number to the perfume package accessory modeling data when the copyright is determined not to be infringed; an eighth step of registering the perfume package accessory modeling data to which the production number is assigned together with perfume package accessory image data and the augmented reality video data on a public registration window; a ninth step of allowing a purchaser to view the public registration window when the purchaser logs in the design server through an application installed on a smartphone; and a tenth step of allowing the purchaser to download the perfume package accessory modeling data when the purchaser makes a purchase or sets a license for the perfume package accessory through the public registration window.

In addition, the design server may be configured to include an algorithm that enables conversion of 2D images into 3D images, and the first step may include a first-first step S110 in which the producer uploads a model design sketch or photograph of the perfume accessory to convert the same into a 3D model design to be stored, so that the model design in the first-first step may be provided in the second step.

In addition, the design server may be configured to include an image memory storing a photograph of the producer, and the first step includes a first-second step in which the producer uploads person, still life, or scenery photograph taken by the producer or image photograph of drawings sketched by the producer to be stored, so that the image photograph in the first-second step may be provided in the second step.

In addition, the design server may be configured to include a model design modification algorithm that enables modification of a size and shape of the model design; and an image correction algorithm that enables 2D or 3D conversion to conform to image correction of the photograph and the shape of the model design, thereby remodeling the 3D model design and the 2D image photograph while modifying and correcting the same.

In addition, the second step may include a second-first step in which an additional modeling option tool for changing a function, a material, and information is provided in the perfume package accessory of the model design so that a function, a material, and information of the remodeled perfume package accessory may be selectively added with the additional modeling option tool.

In addition, the ninth step may be provided so that a unique posting window of each producer is provided in the public registration window, and the producer simultaneously posts videos, photos, advertisements, and promotional materials for each perfume package accessory completed by the producer.

In addition, the tenth step may include: a tenth-first step of transmitting the perfume package accessory modeling data purchased by the purchaser to the smartphone of the purchaser; a tenth-second step of allowing the purchaser to apply his/her appearance and the perfume package accessory to the augmented reality with a smartphone camera of the purchaser; a tenth-third step of transmitting the augmented reality wearing video of the purchaser and the story of the purchaser to the design server; a tenth-fourth step of registering the augmented reality wearing video of the purchaser and the story of the purchaser in a purchaser dedicated window in the design server; and a tenth-fifth step of allowing a third party disclosed to the public or authorized to view the augmented reality wearing video of the purchaser and the purchaser story of the purchaser in the purchaser dedicated window.

According to the present invention, there is an advantage that a perfume package accessory design system and a method of operating a perfume package accessory design system that derive the creative ideas of unknown producers widely distributed in the Internet cloud environment to pioneer a new market are provided, in a effort to improve accessory designs by introducing the Internet experience into accessory design field.

DETAILED DESCRIPTION OF THE INVENTION

Hereinafter, the present invention will be described with reference to the accompanying drawings. In the following description, when it is determined that detailed descriptions of related well-known technologies or configurations may unnecessarily obscure the subject matter of the present invention, the detailed description thereof will be omitted.

In addition, the following terms are defined terms in consideration of functions in the present invention, which may vary according to an intention of a user or operator, custom, or the like. Accordingly, the definitions thereof should be made based on the contents throughout the present specification for explaining the present invention.

Figure 3:
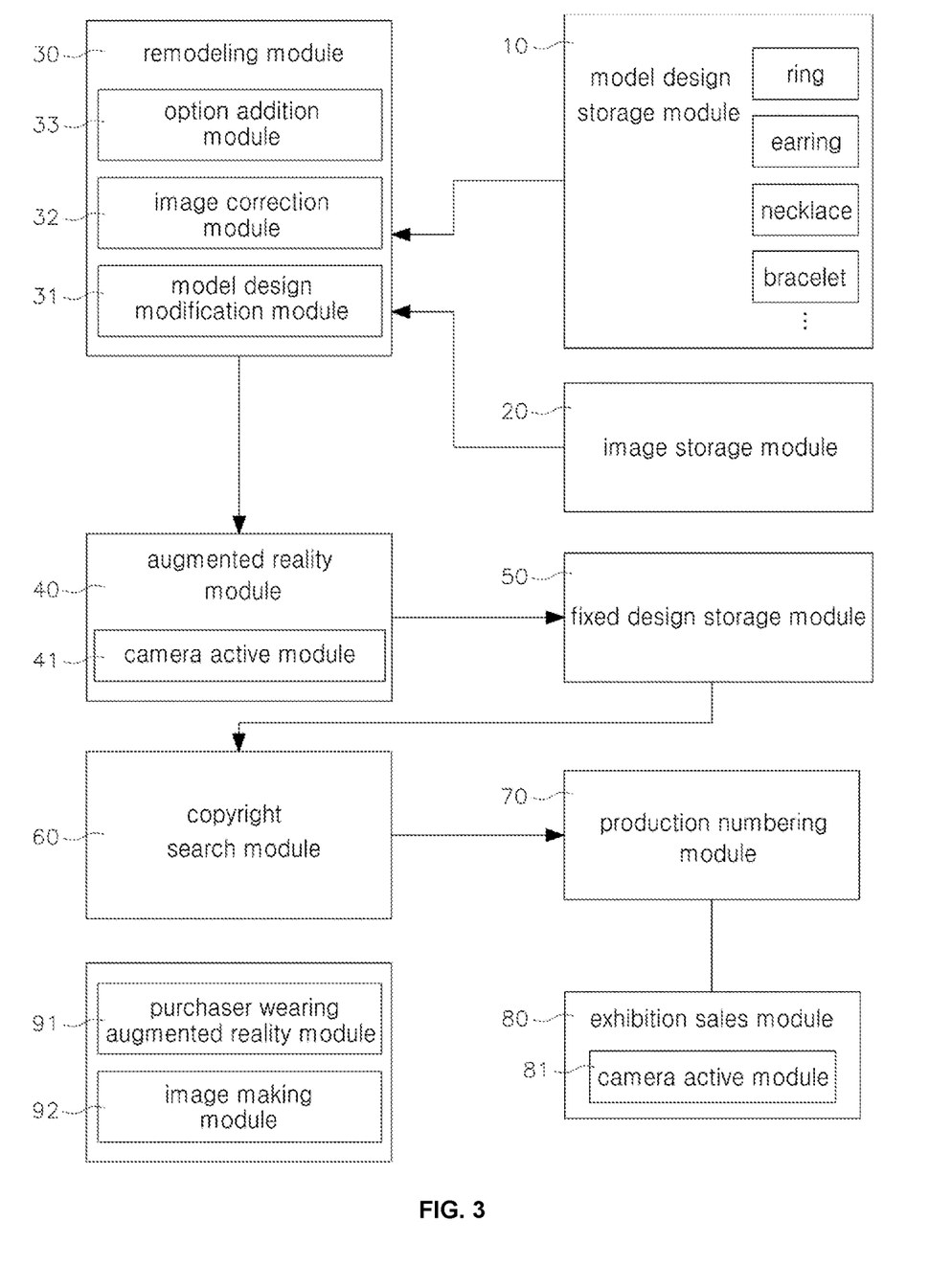
FIG. 3 is a module configuration diagram illustrating a perfume package accessory design system according to the present invention.

As shown in the drawings, the present invention relates to a perfume package accessory design system and a method of operating a perfume package accessory design system, the perfume package accessory design system including a model design storage module 10, an image storage module 20, a remodeling module 30, an augmented reality module 40, fixed design storage module 50, a copyright search module 60, a production numbering module 70, and an exhibition sales module 80, as shown in FIG. 3.

The present invention is configured so that a producer terminal 100, a design server 200, and a purchaser terminal 300 are connected to each other over the Internet, in which the producer terminal 100 and the purchaser terminal 300 use a fish or a smartphone, and are connected to the design server 200 by the application over the Internet.

The model design storage module 10 is provided in the design server 200 and is a database in which model designs of a perfume package accessory having a function of storing perfume are formed and stored.

The model design is a 3D design of a basic model of a perfume package accessory, and is fundamentally modeling data that may be converted into printing data of a 3D printer (STereoLithography File (STL File): 3D printer standard file that stores 3D modeled data).

The perfume package accessory is an accessory in which a perfume storage package is fundamentally provided, and the accessory means wearing jewelry such as earrings, rings, bracelets, necklaces, watches, belts, headbands, hairpins, and the like.

The model design storage module 10 herein stores basic 3D modeling data for such accessories.

In addition, the model design storage module 10 according to the present invention is configured to include an algorithm for converting 2D images to 3D images, so that when the producer uploads a sketched drawing, the drawing is converted into a 3D model design and thus stored.

The algorithm for converting 2D images to 3D images uses a known algorithm in 3D printer file production, and accordingly, a producer's own model design may be formed as a database.

Accordingly, the design server 200 may provide the model design storage module 10 independently to each producer who is logged in, and the model design storage module 10 may be a dedicated production space for each producer.

The image storage module 20 according to the present invention is formed in the design server 200, and is a database space in which a logged-in producer uploads and stores an image photograph.

The image storage module 20 also provides an independent memory to each producer so as to be a dedicated production space of the producer who is logged in, and each producer uploads and stores image photographs such as a person, a sketch, a still life, and landscape taken by the producer in the image storage module 20.

The remodeling module 30 according to the present invention is provided in the design server 200, and is a modeling tool that remodels the perfume package accessory by branching the image to the model design, when a producer selects one of the model designs and an image stored in the image storage module 20.

The remodeling module 30 gives a 2D image photograph to the model design, which is 3D image data.

That is, the remodeling module 30 may be referred to as a modeling tool including a processor for converting a 2D image photograph to a 3D model design.

To this end, the remodeling module 30 is configured to include a model design modification module 31 in which a model design modification processor for modifying the size and shape of the model design is included.

By the model design modification module 31, it is possible to perform a three-dimensional shape change, such as changing a circular ring into an oval shape, changing the size of a circular ring, and so on.

The remodeling module 30 also is configured to include an image correction module 32 including an image correction processor that performs 2D or 3D conversion, in such a manner as to conform to the image correction of the photograph and the shape of the model design.

By means of the image correction module 32, for example, correction such as photoshop is performed, and then 3D conversion is performed with the 3D model design skin, on a person photograph to which design is to be applied.

According to the present invention, the remodeling module 30 is also configured to include an option addition module 33 for changing functions, materials, and information in the perfume package accessory of the model design.

The option addition module 33 is also a 3D design tool, and is provided with a menu for changing functional elements or selectively adding additional information such as materials and advertisements in the 3D modeling design of the perfume package accessory.

When the basic design of the perfume package accessory is determined by the image correction module 32, the size of the perfume discharge hole may be changed, the material is selected and thus the gloss or texture is determined, and text such as a name of the manufacturer, the name of the perfume package accessory, the advertisement, etc. is engraved on a specific area of the basic design.

When a producer inputs his/her video into the smartphone camera which is the producer terminal 100, the augmented reality module 40 according to the present invention applies the perfume package accessory to augmented reality to output a wearing state.

The augmented reality module 40 may be executed in the producer terminal 100 by the design server or smartphone application.

In the case of the design server 200, the producer transmits his/her video to the design server 200, the design server 200 may apply the perfume package accessory modeling data completed by the image correction module 32 to the video in a augmented reality manner to check the wearing state.

In the case of the smartphone application, there is an advantage that the perfume package accessory modeling data may be downloaded from the design server 200 and applied to the smartphone camera image in real time.

To this end, the augmented reality module 40 is configured to include a camera active module 41 for activating a camera of a PC or a smart phone, so that the perfume package accessory may be applied to an image in real time from the camera of the producer in an augmented reality manner.

The fixed design storage module 50 according to the present invention is a memory space for temporarily storing perfume package accessory modeling information and an output image data of the augmented reality module when the wearing state of the perfume package accessory is suitable.

To this end, the augmented reality module 40 is provided with a button that makes it possible to select the design, when the producer like the perfume package accessory design, and not to select the design when the design is not selected, in a augmented reality manner, so that it is possible to select whether or not to perform saving in the fixed design storage module 50.

The copyright search module 60 according to the present invention is a module for determining whether a copyright of the fixed perfume package accessory is infringed.

The copyright search module 60 may determine whether or not to infringe a copyright by accessing an existing copyright registration database, and may prevent a design conflict between perfume package accessories produced by each producer in a design server in advance.

The production numbering module 70 according to the present invention is a module for assigning a production number including a production control command of a 3D printer to a perfume package accessory that is determined not to infringe a copyright.

The production numbering module 70 fundamentally becomes a storage space of the perfume package accessory finally determined, and may be configured to include a processor for converting the 3D modeled perfume package accessory modeling data into an STL file of a 3D printer.

That is, in the case of the remodeling module 30, since the modeling data may be executed faster by a 3D graphic program, the production numbering module 70 may convert the same into an STL file to be stored.

The exhibition sales module 80 according to the present invention is provided so that an image of the perfume package accessory given the production number is registered on a public display window to allow a logged-in purchaser to view the same, and has a menu for allowing the purchaser to make a purchase or set a license.

The exhibition sales module 80 is preferably provided as a dedicated space for each producer, in which the perfume package accessories produced by each producer are preferably grouped.

In the exhibition sales module 80, view, purchase, and license setting is performed using a known internet commerce processor.

In addition, the exhibition sales module 80 includes a dedicated exhibition module 81 with a processor that may simultaneously output videos, photos, advertisements, and promotional materials for a perfume package accessory completed by the producer, thereby attracting a logged-in purchase.

The sale of the perfume package accessory performed in the exhibition sales module preferably includes a licensed sale.

This is because the sales of the present invention provide a 3D printer file of the perfume package accessory, so that the licensed sale is more effective than a one-time item sale.

The present invention also provides a kind of purchase review bulletin board that a purchaser may use.

The purchase review bulletin board may be classified into a purchaser wearing augmented reality module 91 and an image making module 92 in terms of the purchaser.

The purchaser wearing augmented reality module 91 is an augmented reality module used by a purchaser, and may be uses with a smartphone that is a design server 200 or a purchaser terminal 300.

The purchaser is also connected to the design server 200 using a purchaser terminal 300 and a dedicated application, so that a logged-in purchaser uploads his/her image photograph and then applies the same to augmented reality or applies augmented reality to a smartphone camera image.

The purchaser may apply the perfume package accessory displayed in the exhibition sales module 80 to the virtual reality using the purchaser wearing augmented reality module 91, to confirm a wearing state and store an augmented reality wearing video.

The image making module 92 is a bulletin board module in which a purchaser uploads the augmented reality wearing video and fills in a story about the augmented reality wearing video.

The story may include storing a purchase review as a video, describing a usage example as a story after purchase, recording a planned state of use after purchase, and so on.

For example, a purchaser-dedicated space is provided so that a letter to a specific person is pre-recorded in the video and uploaded to a bulletin board after purchase, and then only the specific person may be allowed to view the same.

The present invention relates to a perfume package accessory design system as described above, and is implemented by a method of operating the perfume package accessory design system.

Figure 1:
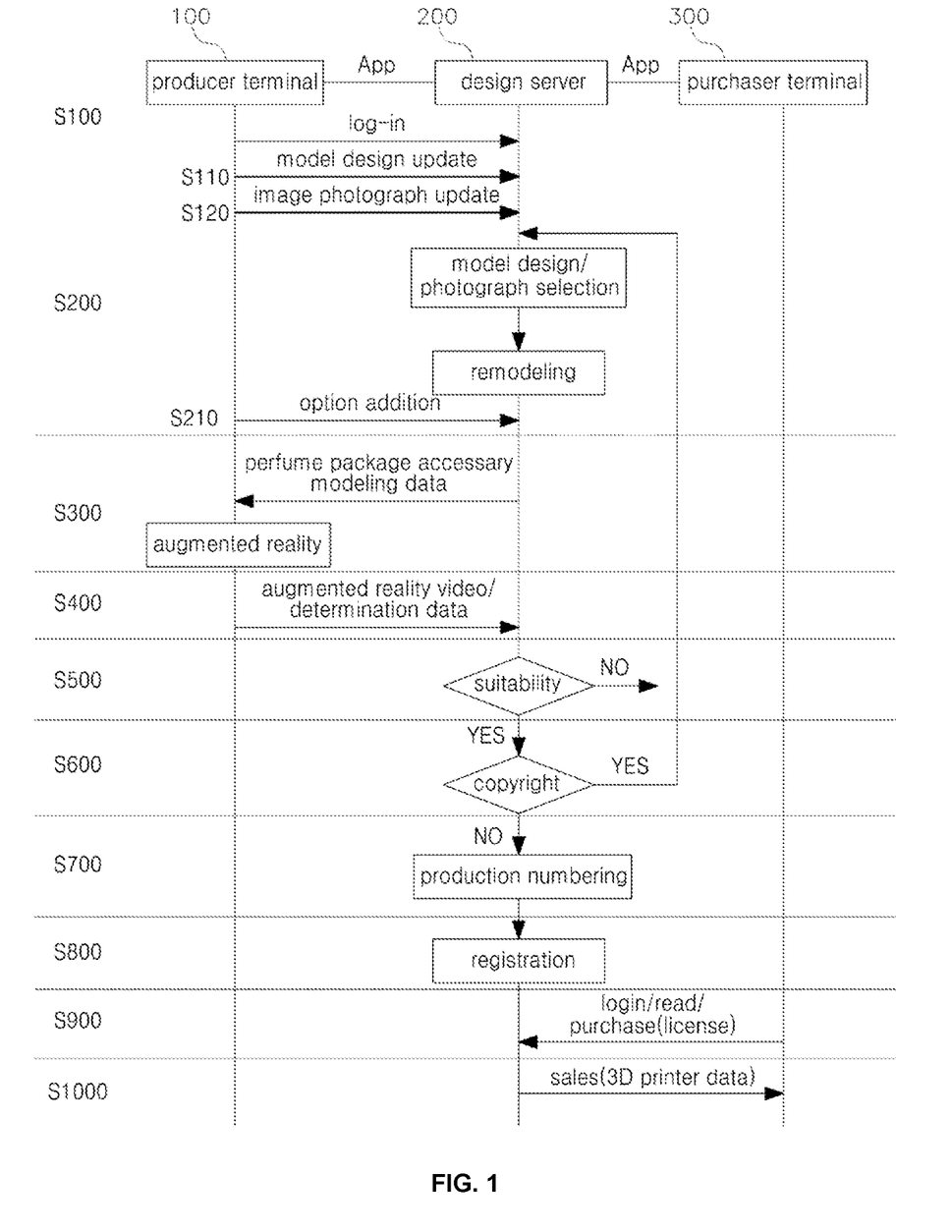
FIG. 1 is an overall sequence diagram illustrating a method of operating a perfume package accessory design system according to the present invention.

Hereinafter, a method of operating the perfume package accessory design system will be described referring to FIG. 1.

The first step S100 of the present invention is a step of logging in the design server through an application installed in a portable terminal of a producer.

The first step S100 is performed in a portable terminal for convenience of description according to an embodiment, and may be also performed in a PC in which a camera module is installed.

In addition, it is natural in the known art that the login may be executed by a direct log-in connection over the Internet, in addition to the log-in by the smartphone application.

In the second step S200 of the present invention, a 3D model design and an image photograph of a perfume package accessory having a function of storing perfume from a database of the design server 200 are provided, so that the perfume package accessory is remodeled with the image and the model design.

The second step S200 is executed by a tool that selects a model design and an image from the model design storage module 10 and the image storage module 20 provided in the design server 200, and then compose the same for remodeling.

To this end, the design server 200 is configured to include a model design modification algorithm that enables modification of the size and shape of the model design; and an image correction algorithm that enables 2D or 3D conversion in such a manner as to conform to the image correction of the photograph and the shape of the model design, thereby remodeling the 3D model design and the 2D image photograph while modifying and correcting the same, in the second step S200.

For advance preparation of the second step S200, the design server 200 of the present invention is configured to include an algorithm that enables conversion of 2D images into 3D images, so that the first step S100 includes a first-first step S110 in which the producer uploads a model design sketch or a photo of the perfume accessory to convert the same into a 3D model design to be updated and stored in the model design module.

For advance preparation of the second step S200, the design server is also configured to include an image memory storing a photograph of the producer, so that the first step S100 includes a first-second step S120 in which the producer uploads person, still life, and scenery photograph taken by the producer, or image photograph of drawing sketched by the producer to store the same in the image memory. It goes without saying that the image memory may be updated to the memory allocated in the image storage module.

In addition, the second step S200 of the present invention includes the second-first step S210 in which an additional modeling option tool for changing a function, a material, and information is provided in the perfume package accessory of the model design, so that modeling is performed by additionally selecting functions, materials, and additional information in the remodeled perfume package accessory with the additional modeling option tool.

Accordingly, in the second step S200, in the remodeled perfume package accessory, a function and a material design are modified as options, and a production advertisement, a production date and time, producer text information, and the like are engraved as options.

The third step S300 according to the present invention is a step in which the producer downloads the remodeled perfume package accessory modeling data and applies his/her appearance and the perfume package accessory to augmented reality using the smartphone camera.

The third step S300 is executed by the augmented reality module 40 in the smartphone which is the design server 200 or the producer terminal 100.

The fourth step S400 according to the present invention is a step of returning the augmented reality video data and data determining whether the modeling of the perfume package accessory modeling is suitable, to the design server 200.

The fourth step S400 of the present invention may also be executed by a selection menu provided in the augmented reality module 40.

The fifth step S500 according to the present invention is a step of feeding back to the second step S200 when the modeling of the perfume package accessory is determined not to be suitable.

When the modeling of the perfume package accessory is determined not to be suitable by the augmented reality module 40 in the fifth step S500, the remodeling process is repeated in the second step S200 to cause a suitable perfume package accessory to be designed.

In the case that the modeling of the perfume package accessory is determined to be suitable, the sixth step S600 of the present invention is a step of determining whether or not infringe a copyright and feeding back to the second step S200 when the copyright is infringed.

In the sixth step S600 of the present invention, the perfume package accessory data that is determined to be suitable is temporarily stored in the fixed design storage module 50, and the copyright is retrieved through the copyright search module 60.

A seventh step S700 of the present invention is a step of assigning a production number to the perfume package accessory modeling data when the copyright is determined not to be infringed.

In the seventh step S700, the production numbering module 70 assigns the production number to the perfume package accessory data that is determined to be suitable.

In an eighth step S800 of the present invention, the perfume package accessory modeling data to which the production number is assigned is registered in a public registration window together with the perfume package accessory image data and the augmented reality video data.

The public registration window is included in the exhibition sales module 80 and may be formed using a known bulletin board algorithm.

The ninth step of the present invention is a step of allowing to view the public registration window when logged-in to the design server 200 through an application installed in a smartphone that is a purchaser terminal 300.

The ninth step S900 is a step of allowing a purchaser to access the exhibition sales module 80 to make a purchase.

In the ninth step S900, it is preferable to provide a unique posting window of each producer in the public registration window, so that the producer simultaneously posts videos, photos, advertisements, and promotional materials for each perfume package accessory completed by the producer.

The tenth step S1000 of the present invention is a step of allowing the purchaser to download the perfume package accessory modeling data, when he/she makes a purchase or sets a license for the perfume package accessory through the public registration window.

The tenth step S1000 of the present invention is also executed by the exhibition sales module 80, in which the exhibition sales processor is realized by a well-known Internet commerce algorithm.

According to the present invention, the tenth step S1000 may provide a method of uploading a purchase review written by the purchaser.

Figure 2:
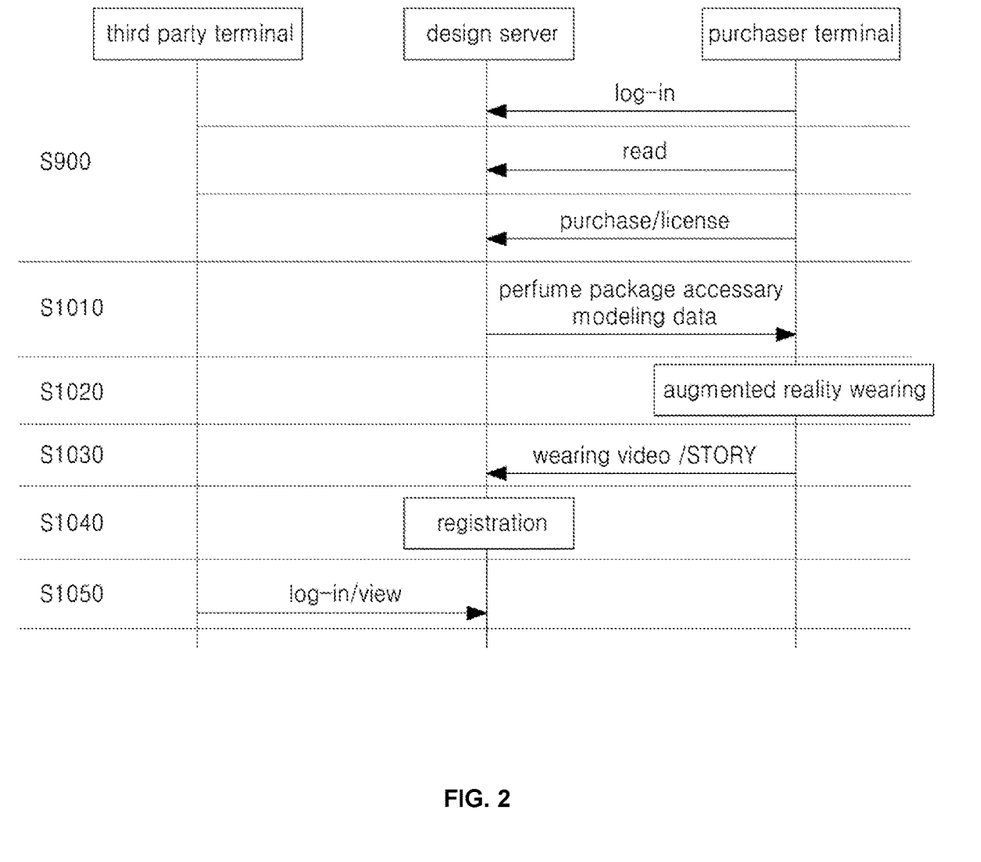
FIG. 2 is a detailed sequence diagram illustrating the tenth step in a method of operating a perfume package accessory design system according to the present invention.

To this end, the method according to the present invention further includes the tenth-first step S1010 of downloading the perfume package accessory modeling data purchased by the purchaser to the smartphone of the purchaser, as shown in FIG. 2.

The tenth-first step S1010 is a step of making a purchase, in which modeling data of the perfume package accessory is downloaded by making a purchase or setting a license.

The tenth-second step S1020 according to the present invention is a step in which the purchaser applies his/her appearance and the perfume package accessory to the augmented reality using a smartphone camera that is the purchaser terminal 300.

The tenth-second step S1020 is executed by the purchaser wearing augmented reality module, and may be executed by an application installed in the smartphone of the purchaser and also be performed by a PC or the like.

The tenth-third step S1030 of the present invention is a step of transmitting the augmented reality wearing video of the purchaser and the story of the purchaser to the design server, the tenth-fourth step S1040 is a step of registering the augmented reality video and the purchaser story of the purchaser in the purchaser dedicated window in the design server, and the tenth-fifth step S1050 is a step in which a third party disclosed to the public or authorized views the augmented reality wearing video and the purchaser story of the purchaser in the purchaser dedicated window.

The tenth-third S1030 to tenth-fifth step S1050 are performed by the image making module 92.

The purchaser may apply the perfume package accessory displayed in the exhibition sales module to the virtual reality using the purchaser wearing augmented reality module 91 to confirm a wearing state and store an augmented reality wearing video in the tenth-third step S1030; upload the augmented reality wearing video and fill-in a story about the augmented reality wearing video in the tenth-fourth step S1040; and allow only the specific person to read the story in the tenth-fifth step S1050.

As shown in the drawings for the description of the present invention as one embodiment of the present invention can be seen that various forms of combination is possible to realize the subject matter of the present invention as shown in the drawings.

Therefore, the present invention is not limited to the above-described embodiments, and it will be said that various changes can be made by any person having ordinary knowledge in the field of the present invention without departing from the gist of the present invention as claimed in the following claims.

What is claimed is:

1. A method of operating a perfume package accessory design system, the method comprising:
   a first step of logging-in to a design server through an application installed on a producer's portable terminal;
   a second step of providing a 3D model design and an image photograph of a perfume package accessory having a function of storing perfume in a database of the design server, to remodel the perfume package accessory with the image in the model design;
   a third step of allowing a producer to download the remodeled perfume package accessory modeling data and apply his/her appearance and the perfume package accessory to augmented reality with a camera of the portable terminal;
   a fourth step of returning augmented reality video data and data determining whether modeling of the perfume package accessory is suitable to the design server;
   a fifth step of feeding back to the second step when the modeling of the perfume package accessory is determined not to be suitable;
   a sixth step of determining whether or not to infringe a copyright when the modeling of the perfume package accessory is determined to be suitable and feeding back to the second step when the copyright is determined to be infringed;
   a seventh step of assigning a production number to the perfume package accessory modeling data when the copyright is determined not to be infringed;
   an eighth step of registering the perfume package accessory modeling data to which the production number is assigned together with perfume package accessory image data and the augmented reality video data on a public registration window;
   a ninth step of allowing a purchaser to view the public registration window when the purchaser logs in the design server through an application installed on a smartphone; and
   a tenth step of allowing the purchaser to download the perfume package accessory modeling data when the purchaser makes a purchase or sets a license for the perfume package accessory through the public registration window.

2. The method of claim 1, wherein the design server is configured to include an algorithm that enables conversion of 2D images into 3D images, and the first step includes a first-first step S110 in which the producer uploads a model design sketch or photograph of the perfume accessory to convert the same into a 3D model design to be stored, so that the model design in the first-first step is provided in the second step.

3. The method of claim 1, wherein the design server is configured to include an image memory storing a photograph of the producer, and the first step includes a first-second step in which the producer uploads person, still life, or scenery photograph taken by the producer or image photograph of drawings sketched by the producer to be stored, so that the image photograph in the first-second step is provided in the second step.

4. The method of claim 1, wherein the design server is configured to include a model design modification algorithm that enables modification of a size and shape of the model design; and an image correction algorithm that enables 2D or 3D conversion to conform to image correction of the photograph and the shape of the model design, thereby remodeling the 3D model design and the 2D image photograph while modifying and correcting the same.

5. The method of claim 1, wherein the second step includes a second-first step in which an additional modeling option tool for changing a function, a material, and information is provided in the perfume package accessory of the model design so that a function, a material, and information of the remodeled perfume package accessory is selectively added with the additional modeling option tool.

6. The method of claim 1, wherein the ninth step is provided so that a unique posting window of each producer is provided in the public registration window, and the producer simultaneously posts videos, photos, advertisements, and promotional materials for each perfume package accessory completed by the producer.

7. The method of claim 1, wherein the tenth step includes:
   a tenth-first step of transmitting the perfume package accessory modeling data purchased by the purchaser to the smartphone of the purchaser;
   a tenth-second step of allowing the purchaser to apply his/her appearance and the perfume package accessory to the augmented reality with a smartphone camera of the purchaser;
   a tenth-third step of transmitting the augmented reality wearing video of the purchaser and the story of the purchaser to the design server;
   a tenth-fourth step of registering the augmented reality wearing video of the purchaser and the story of the purchaser in a purchaser dedicated window in the design server; and
   a tenth-fifth step of allowing a third party disclosed to the public or authorized to view the augmented reality wearing video of the purchaser and the purchaser story of the purchaser in the purchaser dedicated window.

* * * * *